(12) United States Patent
Yamaguchi et al.

(10) Patent No.: US 12,275,369 B2
(45) Date of Patent: Apr. 15, 2025

(54) BUCKLE DEVICE

(71) Applicant: KABUSHIKI KAISHA TOKAI-RIKA-DENKI-SEISAKUSHO, Aichi (JP)

(72) Inventors: Ryuji Yamaguchi, Aichi-ken (JP); Yoshio Mizuno, Aichi-ken (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 394 days.

(21) Appl. No.: 17/886,379

(22) Filed: Aug. 11, 2022

(65) Prior Publication Data

US 2023/0064662 A1  Mar. 2, 2023

(30) Foreign Application Priority Data

Aug. 26, 2021 (JP) .................. 2021-138399

(51) Int. Cl.
  *B60R 22/185* (2006.01)
  *B60R 22/18* (2006.01)
  *B60R 22/195* (2006.01)

(52) U.S. Cl.
  CPC .......... *B60R 22/185* (2013.01); *B60R 22/195* (2013.01); *B60R 2022/1806* (2013.01); *B60R 2022/1812* (2013.01)

(58) Field of Classification Search
  CPC .... B60R 2022/1812; B60R 2022/1806; B60R 22/195; B60R 22/185; B60R 2022/286; B60R 22/4676
  See application file for complete search history.

(56) References Cited

U.S. PATENT DOCUMENTS

| | | | | | |
|---|---|---|---|---|---|
| 5,967,441 | A | * | 10/1999 | Kohlndorfer | B60R 22/3413 242/379.1 |
| 6,047,914 | A | * | 4/2000 | Sasaki | B60R 22/4676 280/805 |
| 6,598,904 | B2 | * | 7/2003 | Nagata | B60R 22/3413 280/805 |
| 6,641,075 | B2 | * | 11/2003 | Specht | B60R 22/4676 242/379.1 |
| 6,659,505 | B1 | * | 12/2003 | Knox | B60R 21/01546 280/808 |

(Continued)

FOREIGN PATENT DOCUMENTS

| | | |
|---|---|---|
| JP | 2001-180437 A | 7/2001 |
| JP | 2019-043435 A1 | 3/2019 |
| JP | 2020-125010 A1 | 8/2020 |

*Primary Examiner* — David R Dunn
*Assistant Examiner* — Christopher E Veraa
(74) *Attorney, Agent, or Firm* — Studebaker Brackett PLLC

(57) ABSTRACT

In the buckle device, when or after torsional deformation of the torsion shaft has started and allowance of the drawing-out of the belt has started, the breaking portion of the shear plate is started to be deformed by the coupling hole side surface of the spool, whereby the breaking portion allows the rotation of the spool and allows the drawing-out of the belt. Therefore, the allowable drawing-out load of the belt can be made the sum of the load for torsionally deforming the torsion shaft and the load for deforming the breaking portion, and can be increased.

10 Claims, 6 Drawing Sheets

(56) References Cited

U.S. PATENT DOCUMENTS

| | | | | |
|---|---|---|---|---|
| 7,410,113 | B2* | 8/2008 | Keller | B60R 22/3413 |
| | | | | 242/382.5 |
| 7,744,029 | B2* | 6/2010 | Gentner | B60R 22/3413 |
| | | | | 280/805 |
| 7,874,589 | B2* | 1/2011 | Hiramatsu | B60R 22/4676 |
| | | | | 280/805 |
| 8,286,903 | B2* | 10/2012 | Ogawa | B60R 22/4676 |
| | | | | 242/379.1 |
| 8,955,785 | B2* | 2/2015 | Yanagawa | B60R 22/28 |
| | | | | 280/805 |
| 9,212,024 | B2* | 12/2015 | Maekubo | B65H 75/48 |
| 2001/0006204 | A1 | 7/2001 | Kajiyama | |
| 2016/0257284 | A1* | 9/2016 | Farooq | B60R 22/28 |
| 2019/0071053 | A1 | 3/2019 | Imanaka et al. | |
| 2020/0247352 | A1* | 8/2020 | Shimazu | B60R 22/26 |

* cited by examiner

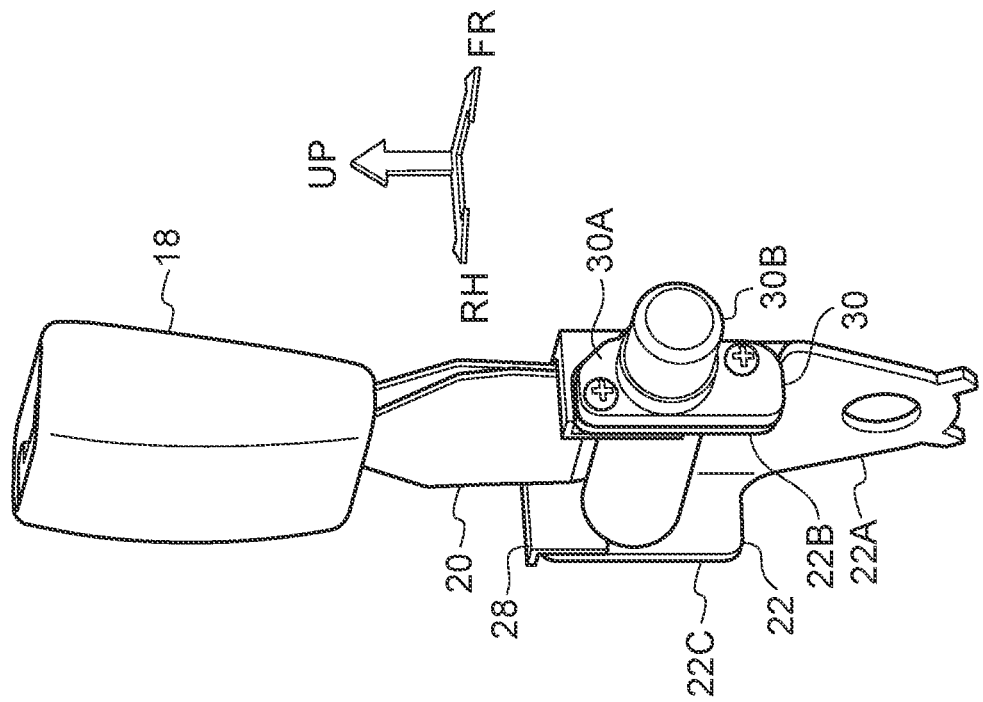
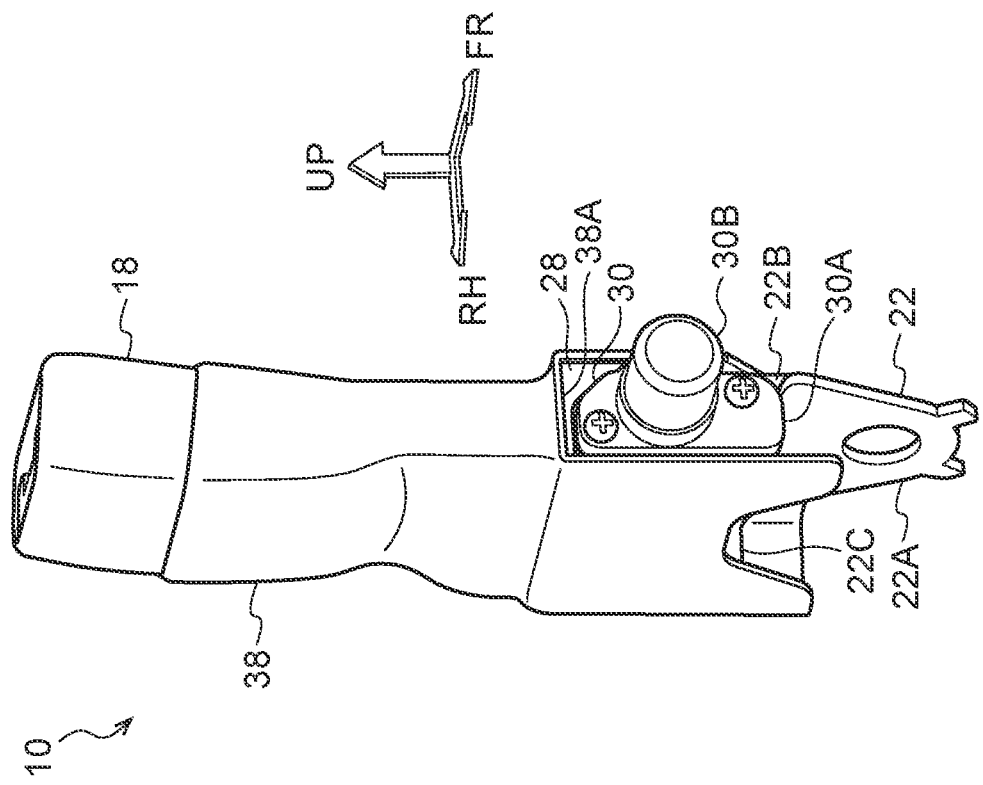

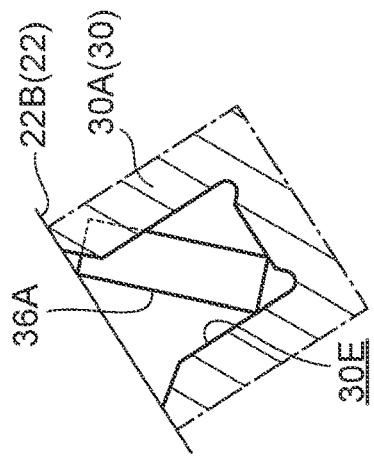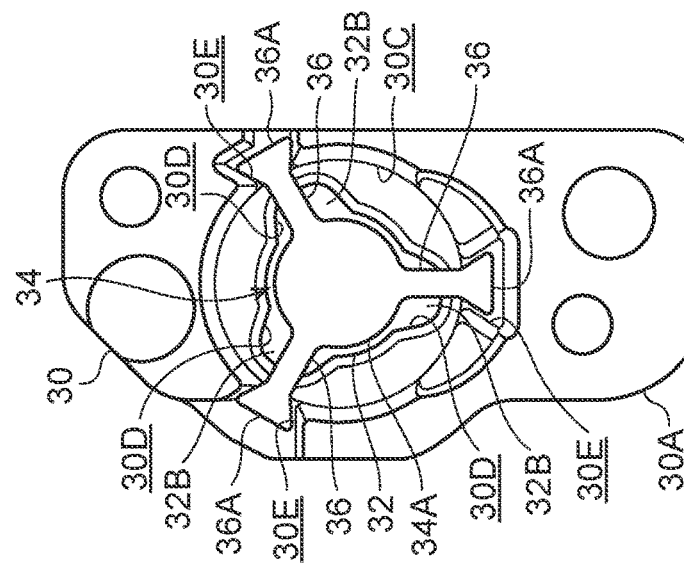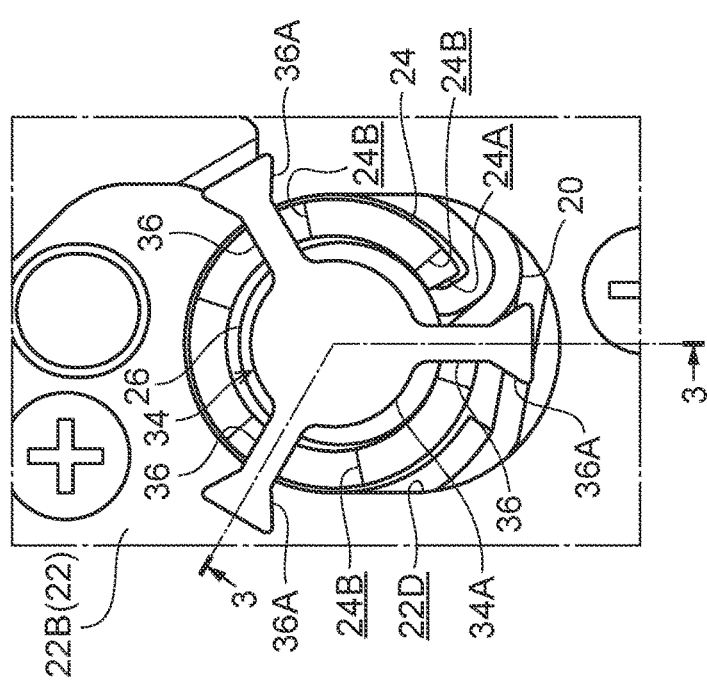

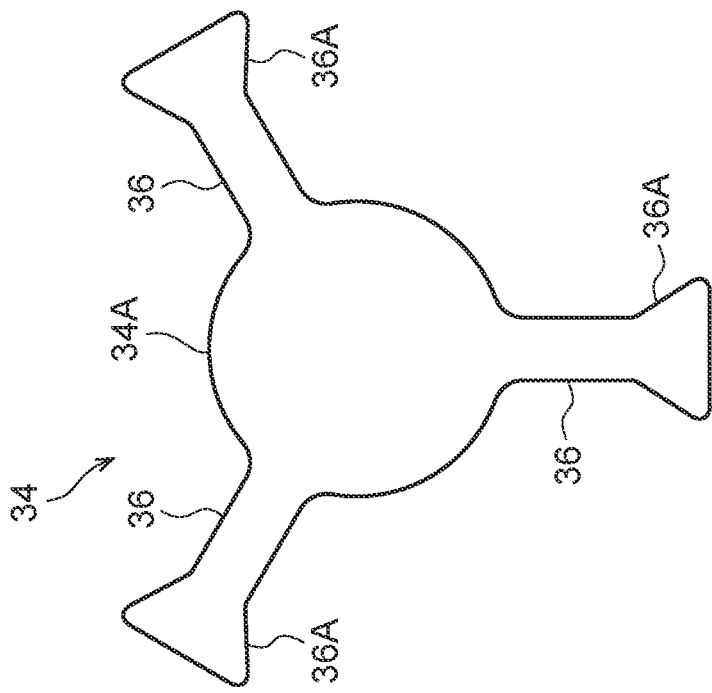
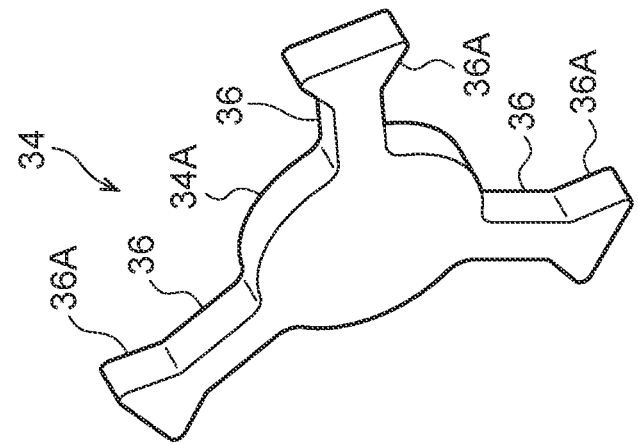

BUCKLE DEVICE

CROSS-REFERENCE TO RELATED APPLICATION

This application is based on and claims priority under 35 USC 119 from Japanese Patent Application No. 2021-138399 filed on Aug. 26, 2021, the disclosure of which is incorporated by reference herein.

BACKGROUND

Technical Field

The present invention relates to a buckle device in which a buckle main body and a winding shaft are coupled via a coupling member.

Related Art

In the buckle device described in Japanese Patent Application Laid-Open (JP-A) No. 2020-125010, the tip side of the webbing is coupled to the buckle main body, the webbing is wound around a spool from the base end side, and the torsion shaft is coupled to the spool to restrict the drawing-out of the webbing from the spool. The torsion shaft is deformed to allow the webbing to be drawn out from the spool, thereby allowing the buckle main body to extend.

Here, in such a buckle device, it is preferable that the allowable drawing-out load of the webbing can be increased.

SUMMARY

In view of the above fact, an object of the present invention is to obtain a buckle device capable of increasing an allowable drawing-out load of a coupling member.

A buckle device according to a first aspect of the present invention includes: a buckle main body with which a tongue provided at a webbing to be applied to an occupant is engaged; a coupling member whose tip side is coupled to the buckle main body; a winding shaft around which the coupling member is wound from a base end side; a restricting member configured to restrict drawing-out of the coupling member from the winding shaft, the restricting member being deformed and allowing drawing-out of the coupling member from the winding shaft to allow extension of the buckle main body; and a breaking member configured to restrict drawing-out of the coupling member from the winding shaft, deformation of the breaking member being started to allow drawing-out of the coupling member from the winding shaft when or after the restricting member has started to be deformed, and the breaking member being broken to permit drawing-out of the coupling member from the winding shaft.

In the buckle device of the first aspect of the invention, the tongue provided at the webbing to be applied to the occupant is engaged with the buckle main body. The tip side of the coupling member is coupled to the buckle main body, the coupling member is wound around the winding shaft from the base end side, and the restricting member is configured to restrict drawing-out of the coupling member from the winding shaft. The restricting member is deformed and allows drawing-out of the coupling member from the winding shaft to allow extension of the buckle main body.

Here, the breaking member is configured to restrict drawing-out of the coupling member from the winding shaft, and when or after the restricting member has started to be deformed (the restricting member has started allowance of drawing-out of the coupling member from the winding shaft), the breaking member is started to be deformed to allow drawing-out of the coupling member from the winding shaft. Then, the breaking member is broken to permit allow drawing-out of the coupling member from the winding shaft. Therefore, the allowable drawing-out load of the coupling member can be made the sum of the load for deforming the restricting member and the load for deforming the breaking member, and can be increased.

A buckle device according to a second aspect of the present invention, in the buckle device of the first aspect of the present invention, deformation of the breaking member is started when or after plastic deformation of the restricting member has started.

In the buckle device of the second aspect of the invention, when or after plastic deformation of the restricting member has started, deformation of the breaking member is started. Therefore, since the breaking member is deformed when or after the load for deforming the restricting member has increased, the allowable drawing-out load of the coupling member can be effectively increased.

In the buckle device according to the first or second aspect of the present invention, a buckle device according to a third aspect of the present invention includes a locking body to which the restricting member and the breaking member are locked.

In the buckle device of the third aspect of the invention, the restricting member and the breaking member are locked to the locking body. Therefore, the accuracy of the relative position between the restricting member and the breaking member can be increased, and the accuracy of the relative timing between the start of deformation of the restricting member and the start of deformation of the breaking member can be increased.

In the buckle device according to any one of the first to third aspects of the present invention, a buckle device according to a fourth aspect of the present invention further includes a blocking portion configured to block entry of a broken piece that has broken off of the breaking member to at least one of a winding shaft side or a restricting member side.

In the buckle device of the fourth aspect of the invention, the blocking portion blocks the broken piece that has broken off of the breaking member from entering at least one of the winding shaft side or the restricting member side. Therefore, it is possible to prevent the broken piece from inhibiting the operation of at least one of the winding shaft or the restricting member.

A buckle device according to a fifth aspect of the present invention includes: a buckle main body with which a tongue provided at a webbing to be applied to an occupant is engaged; a coupling member whose tip side is coupled to the buckle main body; a winding shaft around which the coupling member is wound from a base end side; a restricting member configured to restrict drawing-out of the coupling member from the winding shaft, the restricting member being deformed and allowing drawing-out of the coupling member from the winding shaft to allow extension of the buckle main body; a breaking member configured to restrict drawing-out of the coupling member from the winding shaft, deformation of the breaking member being started to allow drawing-out of the coupling member from the winding shaft, and the breaking member being broken to permit drawing-out of the coupling member from the winding shaft; and a blocking portion configured to block entry of a broken piece that has broken off of the breaking member to at least one of a winding shaft side or a restricting member side.

In the buckle device of the fifth aspect of the invention, the tongue provided at the webbing to be applied to the occupant is engaged with the buckle main body. The tip side of the coupling member is coupled to the buckle main body, the coupling member is wound around the winding shaft from the base end side, and the restricting member is configured to restrict drawing-out of the coupling member from the winding shaft. The restricting member is deformed and allows drawing-out of the coupling member from the winding shaft to allow extension of the buckle main body. Moreover, the breaking member is configured to restrict the drawing-out of the coupling member from the winding shaft, the breaking member is deformed to allow the drawing-out of the coupling member from the winding shaft, and the breaking member is broken to permit the drawing-out of the coupling member from the winding shaft.

By the way, in the buckle device described in JP-A No. 2020-125010, if a breaking member being broken to permit drawing-out of the webbing from the spool is provided, it is preferable that the broken piece that has broken off of the breaking member can be prevented from inhibiting the operation of at least one of the spool or the torsion shaft.

Here, in the buckle device of the fifth aspect of the invention, the blocking portion blocks the broken piece that has broken off of the breaking member from entering at least one of the winding shaft side or the restricting member side. Therefore, it is possible to prevent the broken piece from inhibiting the operation of at least one of the winding shaft or the restricting member.

BRIEF DESCRIPTION OF THE DRAWINGS

Exemplary embodiments of the present invention will be described in detail based on the following figures, wherein:

FIG. 2A is a perspective view showing the entire buckle device according to the embodiment of the present invention as viewed diagonally from the front right;

FIG. 2B is a perspective view showing an inside of the buckle device according to the embodiment of the present invention as viewed diagonally from the front right;

FIG. 4A is a side view showing the main part of the buckle device according to the embodiment of the present invention as viewed from the front;

FIG. 4B is a side view showing the main part of the buckle device according to the embodiment of the present invention as viewed from the rear;

FIG. 4C is a cross-sectional view of the buckle device according to the embodiment of the present invention, showing a broken piece that has broken off of a shear plate and an opening opened to an inner hole of an regulation recessed portion in a case;

FIG. 5A is a front view showing the shear plate of the buckle device according to the embodiment of the present invention;

FIG. 5B is a perspective view showing the shear plate of the buckle device according to the embodiment of the present invention.

DETAILED DESCRIPTION

Figure 1:
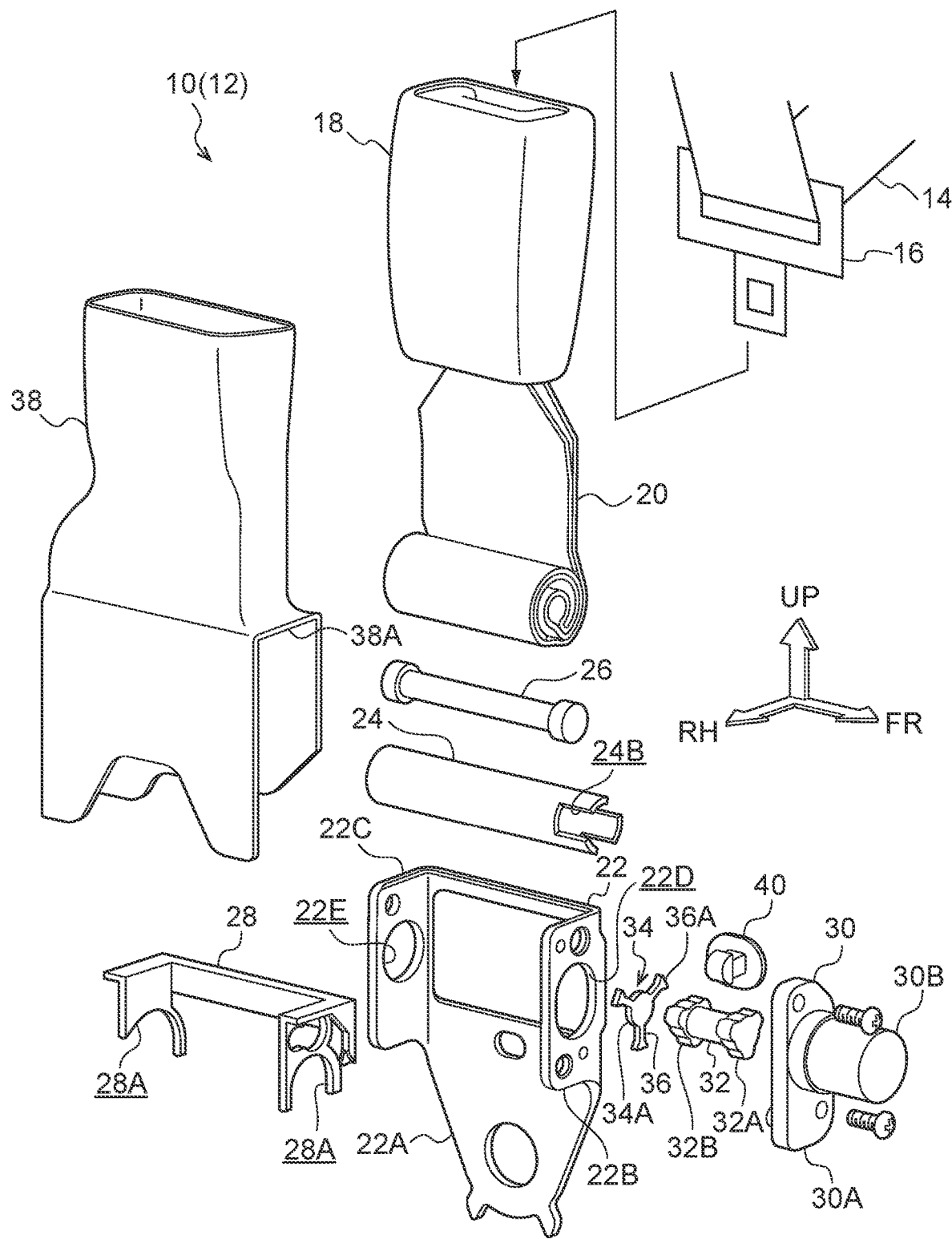
FIG. 1 is an exploded perspective view showing a buckle device according to an embodiment of the present invention as viewed diagonally from the front right.

FIG. 1 is an exploded perspective view of a buckle device 10 according to an embodiment of the present invention as viewed diagonally from the front right. FIG. 2A shows the buckle device 10 in a perspective view as viewed diagonally from the front right, and FIG. 2B shows the inside of the buckle device 10 in a perspective view as viewed diagonally from the front right. In the figures, the front side of the buckle device 10 is indicated by an arrow FR, the right side (face side) of the buckle device 10 is indicated by an arrow RH, and the upper side of the buckle device 10 is indicated by an arrow UP.

The buckle device 10 according to the present embodiment constitutes a seat belt device 12 of a vehicle (automobile), and the seat belt device 12 is applied to a seat (not shown) in a vehicle interior. The seat belt device 12 is provided with a winding device (not shown), and the winding device is installed, on the outer side in the vehicle width direction and lower side, of the seat rear portion. In the winding device, a long strip-shaped webbing 14 (see FIG. 1) is wound from the base end side, and the webbing 14 is urged toward the winding side toward the winding device and drawn out upward from the winding device. The winding device is provided with a lock mechanism, and the lock mechanism locks the drawing-out of the webbing 14 from the winding device in an emergency (collision or the like) of the vehicle.

The webbing 14 is movably penetrated into a through anchor (not shown) on the tip side with respect to the winding device, and the through anchor is installed, on the outer side in the vehicle width direction and upper side, of the seat rear portion. An anchor (not shown) is fixed to the tip portion of the webbing 14, and the anchor is installed, on the outer side in the vehicle width direction and lower side, of the seat rear portion. The webbing 14 is movably penetrated into a tongue 16 (see FIG. 1) between the through anchor and the anchor.

The buckle device 10 is installed, on the inner side in the vehicle width direction and lower side, of the seat rear portion, and the front side, the right side, and the upper side of the buckle device 10 are respectively directed to the front or rear of the vehicle, the inner side in the vehicle width direction, and the upper side of the vehicle.

As shown in FIGS. 1, 2A, and 2B, a buckle main body 18 having a substantially rectangular parallelepiped shape is provided on an upper portion of the buckle device 10. The tongue 16 is engageable with the buckle main body 18 from the upper side, the tongue 16 is engaged with the buckle main body 18, and the webbing 14 is applied to the occupant seated on the seat. Accordingly, a portion between the through anchor and the tongue 16 of the webbing 14 (shoulder webbing) is diagonally stretched from the shoulder portion to the waist portion (including the chest portion) of the occupant, and a portion between the tongue 16 and the anchor of the webbing 14 (wrap webbing) is laterally stretched over the waist portion of the occupant. The engagement of the tongue 16 with the buckle main body 18 is made releasable, and releasing the engagement of the tongue 16 with the buckle main body 18 releases the application of the webbing 14 to the occupant. The lower portion of the buckle main body 18 is gradually reduced toward the lower side in the left-right direction.

A tip side portion (upper portion) of a strip-shaped belt 20 (webbing) as a coupling member is coupled to a lower portion of the buckle main body 18, and the belt 20 is made of the same material as the webbing 14, for example. The base end portion (lower end portion) of the belt 20 is folded back and sewn to the vicinity of the base end portion of the belt 20, whereby the base end side portion (lower side portion) of the belt 20 is made annular.

A lower portion of the buckle device 10 is provided with a frame 22 made of metal as a support body, and the frame 22 has a U-shaped cross section plate shape. A left portion of the frame 22 is provided with a back plate 22A, and the frame 22 is fixed to a vehicle body side (for example, a rear portion of a seat lower portion) at a lower end portion of the back plate 22A. The front portion and the rear portion of the frame 22 are respectively provided with a leg plate 22B and a leg plate 22C, and the leg plate 22B and the leg plate 22C protrude rightward from the back plate 22A. The leg plate 22B and the leg plate 22C are respectively formed to be penetrated with a substantially circular support hole 22D and a circular support hole 22E, and the support hole 22D and the support hole 22E face each other in the front-rear direction.

The support hole 22D and the support hole 22E of the frame 22 are penetrated with a spool 24 made of metal and having a substantially cylindrical shape as a winding shaft, and the spool 24 is supported by the frame 22. The axial direction of the spool 24 is parallel to the front-rear direction, and the spool 24 is rotatable about the central axis. A portion excluding the front portion of the spool 24 is formed to be penetrated with a long rectangle-shaped through-insertion hole 24A (see FIG. 4A), and the through-insertion hole 24A extends in the axial direction of the spool 24 and is opened to the rear side. The front portion of the spool 24 is formed to be penetrated with a plurality of (three in the present embodiment) rectangular coupling holes 24B as portions to be coupled, the plurality of coupling holes 24B are arranged at equal intervals in the circumferential direction of the spool 24, and each of the coupling holes 24B is opened to the front side. A circumferential dimension of the spool 24 of the coupling hole 24B is larger than a circumferential dimension of the spool 24 (dimension in the width direction) of the through-insertion hole 24A, and one coupling hole 24B is communicated with the through-insertion hole 24A.

A substantially columnar bar 26 made of metal as a locking member is coaxially inserted into the spool 24, and both end portions in the axial direction of the bar 26 are coaxially enlarged in diameter and fitted into the spool 24. The base end side portion (annular portion) of the belt 20 is inserted into the through-insertion hole 24A of the spool 24, and the intermediate portion in the axial direction of the bar 26 is inserted into the inside of the base end side portion of the belt 20, whereby the base end side portion of the belt 20 is locked in the spool 24 by the bar 26 and coupled to the spool 24. The belt 20 is wound around the spool 24, and the belt 20 is drawn out from the left side to the upper side of the spool 24.

A protector 28 made of resin and having a substantially U-shaped cross section plate shape is fitted in the upper portion of the frame 22, and the left wall, the front wall, and the rear wall of the protector 28 respectively cover the back plate 22A, the leg plate 22B, and the leg plate 22C of the frame 22. The upper end portion of the protector 28 protrudes to the outside of the protector 28, and the upper end portion of the protector 28 is placed on the upper side of the frame 22. A substantially semicircular into-insertion hole 28A is formed to be penetrated in the lower portion of the front wall and the rear wall of the protector 28, and the into-insertion hole 28A is opened downward, to have an upper portion of the spool 24 inserted. The belt 20 is inserted into the protector 28, and the protector 28 restricts contact of the belt 20 with the frame 22.

Figure 3:
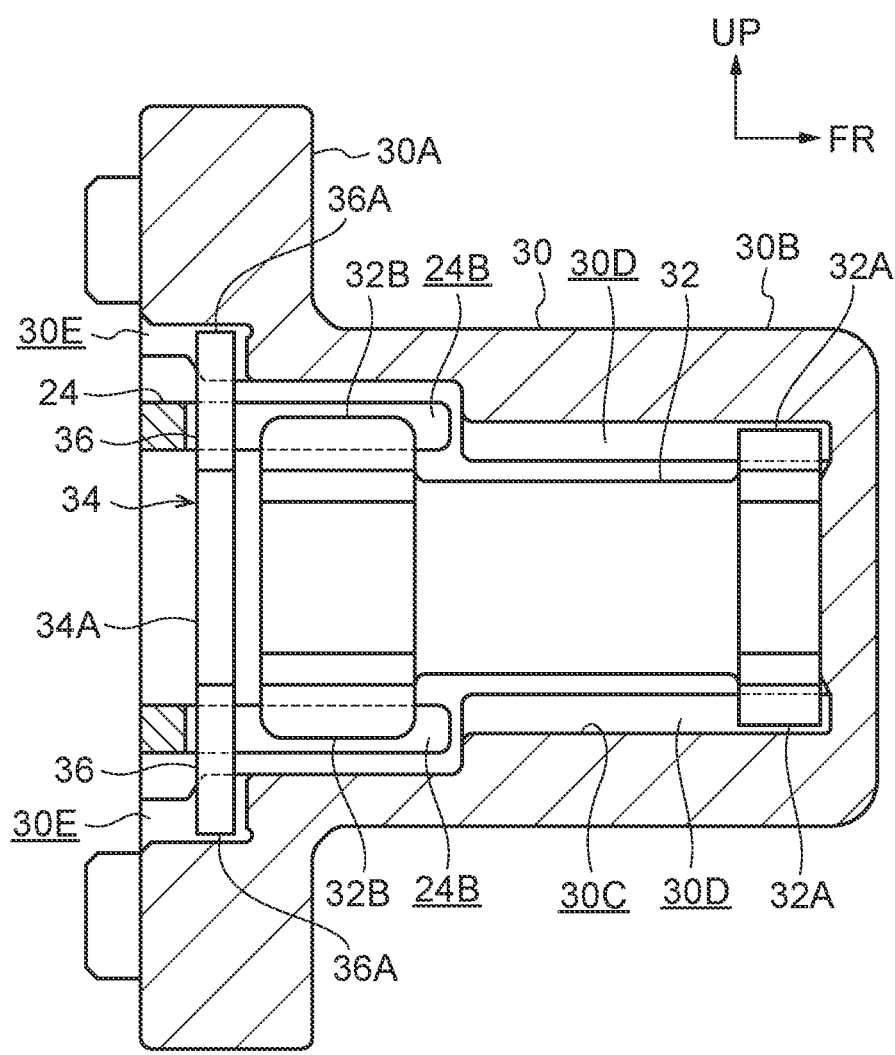
FIG. 3 is a cross-sectional view (a cross-sectional view taken along line 3-3 in FIG. 4A) showing a main part of the buckle device according to the embodiment of the present invention as viewed from the right side.

A metal case 30 (see FIG. 3) as a locking body is disposed on the front side of the frame 22 (leg plate 22B). The case 30 is provided with a substantially rectangular plate-shaped regulation plate 30A as a regulating portion, and the regulation plate 30A is fixed to the leg plate 22B, and the case 30 is fixed to the leg plate 22B. A locking cylinder 30B having a substantially bottomed cylindrical shape is integrally formed on the front side of the regulation plate 30A, and the axial direction of the locking cylinder 30B is parallel to the front-rear direction.

The inside of the locking cylinder 30B is formed into a substantially columnar inner hole 30C, penetrates the regulation plate 30A, and is opened to the rear side of the regulation plate 30A, and the front portion of the spool 24 is coaxially inserted into the rear side portion of the inner hole 30C. The diameter of the front side portion of the inner hole 30C is smaller than the diameter of the rear side portion of the inner hole 30C, and a plurality of (three in the present embodiment) substantially trapezoidal columnar locking holes 30D (see FIG. 4B) as locking portions are formed on the peripheral surface of the front side portion of the inner hole 30C. The locking hole 30D has an axial direction parallel to the front-rear direction (axial direction of the inner hole 30C) and is integrated with the front wall (bottom wall) of the locking cylinder 30B, and the plurality of locking holes 30D are arranged at equal intervals in the circumferential direction of the inner hole 30C. A plurality of (three in the present embodiment) substantially trapezoidal regulation recessed portions 30E (see FIG. 4B) as blocking portions are formed on the rear surface of the regulation plate 30A, the plurality of regulation recessed portions 30E are arranged at equal intervals in the circumferential direction of the locking cylinder 30B, and the rear side of the regulation recessed portion 30E is closed by the leg plate 22B of the frame 22. The regulation recessed portion 30E is opened to the inner hole 30C, and the dimension in the width direction (the circumferential direction of the inner hole 30C) of the regulation recessed portion 30E decreases toward the radial inside of the inner hole 30C.

A substantially columnar torsion shaft 32 (see FIGS. 3 and 4B) made of metal as a restricting member (energy absorbing member) is coaxially disposed in the inner hole 30C. A plurality of (three in the present embodiment) substantially trapezoidal columnar locking protrusions 32A as portions to be locked are integrally formed at the front end portion of the torsion shaft 32, and the plurality of locking protrusions 32A are arranged at equal intervals in the circumferential direction of the torsion shaft 32 with the respective axial directions being parallel to the front-rear direction (the axial direction of the torsion shaft 32). The locking protrusion 32A is inserted into the locking hole 30D of the case 30 (inner hole 30C) and fitted to the locking hole 30D in the circumferential direction of the torsion shaft 32, and the torsion shaft 32 is locked to the case 30 (inner hole 30C) so as to be relatively non-rotatable. A plurality of (three in the present embodiment) substantially trapezoidal columnar coupling protrusions 32B as coupling portions are integrally formed at the rear end portion of the torsion shaft 32, and the plurality of coupling protrusions 32B are arranged at equal intervals in the circumferential direction of the torsion shaft 32 with the respective axial directions being parallel to the front-rear direction (the axial direction of the torsion shaft 32). The coupling protrusion 32B is inserted into the coupling hole 24B of the spool 24 and fitted to the coupling hole 24B in the circumferential direction of the torsion shaft 32, and the torsion shaft 32 is relatively non-rotatably coupled to the spool 24 to restrict the rotation of the spool 24.

A metal shear plate 34 (see FIGS. 3, 4A, 4B, 5A, and 5B) as a breaking member is disposed between the spool 24 and the torsion shaft 32, and the shear plate 34 is disposed coaxially with the inner hole 30C of the case 30. A disc-shaped base portion 34A is coaxially provided in the central portion of the shear plate 34, and the base portion 34A is coaxially inserted into the spool 24 on the rear side of the torsion shaft 32. A plurality of (three in the present embodiment) breaking portions 36 having a substantially elongated rectangular plate shape are integrally formed on the outer periphery of the base portion 34A, and the plurality of breaking portions 36 are each extended radially outward of the base portion 34A and are arranged at equal intervals in the circumferential direction of the base portion 34A. A base end side portion of the breaking portion 36 is formed in a rectangular shape, and the base end side portion of the breaking portion 36 is penetrated into the coupling hole 24B of the spool 24 and is separated from both side surfaces of the coupling hole 24B in the circumferential direction of the spool 24. A tip portion 36A (a portion excluding a base end side portion) of the breaking portion 36 is formed in a trapezoidal plate shape, and a dimension in a width direction (a circumferential direction of the shear plate 34) of the tip portion 36A of the breaking portion 36 is increased toward a radially outer side of the shear plate 34. The tip portion 36A of the breaking portion 36 is inserted into the regulation recessed portion 30E of the case 30 (regulation plate 30A), and the tip portion 36A of the breaking portion 36 abuts on the side surface of the regulation recessed portion 30E to regulate (lock) the rotation of the shear plate 34.

A boot 38 (cover) having a substantially rectangular cylindrical shape as a covering member is provided in a range from the buckle main body 18 to the frame 22, and the boot 38 is made of a soft resin and has flexibility. The upper portion of the boot 38 is gradually reduced in the left-right direction toward the lower side, and the boot 38 has the lower portion of the buckle main body 18 fitted into the upper portion thereof to restrict the movement of the buckle main body 18 to the lower side. The belt 20 is inserted into an intermediate portion in the vertical direction of the boot 38, and the lower portion of the boot 38 is opened to the front side and has the frame 22 (including the protector 28, the spool 24, and the bar 26) fitted therein. In the boot 38, a rectangular frame plate-shaped abutment frame 38A is integrally formed immediately above the lower portion, and the belt 20 is inserted into the abutment frame 38A. The upper end portion of the protector 28 abuts on the lower side of the abutment frame 38A, whereby the movement of the boot 38 to the lower side is restricted. As described above, the belt 20 is wound around the spool 24, whereby the elastic contraction force between the buckle main body 18 and the frame 22 is acted on the boot 38 in a state where the tension is acted on the belt 20, and the boot 38 urges the frame 22 downward to be self-standing with respect to the frame 22 and urges the buckle main body 18 upward to cause the buckle main body 18 to be self-standing. A soft resin clip 40 penetrates a left wall of a lower portion of the boot 38 and the back plate 22A of the frame 22, and the clip 40 sandwiches the left wall of the boot 38 and the back plate 22A to fix the boot 38 to the frame 22.

Next, the action of the present embodiment will be described.

In the seat belt device 12 having the above configuration, in the buckle device 10, the torsion shaft 32 restricts the rotation of the spool 24 to restrict the drawing-out of the belt 20 from the spool 24 and the upward extension of the buckle main body 18, and engaging the tongue 16 of the webbing 14 with the buckle main body 18 applies the webbing 14 to the occupant.

In an emergency (collision or the like) of the vehicle, the locking mechanism of the winding device locks the drawing-out of the webbing 14 from the winding device, whereby the occupant is restrained by the webbing 14. Then, for example, when an inertial force is acted on the occupant and the webbing 14 is drawn by the occupant, a drawing-out force from the spool 24 is acted on the belt 20 from the webbing 14 via the tongue 16 and the buckle main body 18, whereby a rotational force is acted on the spool 24. Furthermore, when the torsion shaft 32 is torsionally deformed between the front end portion and the rear end portion by the rotational force acted on the spool 24, the rotation of the spool 24 is allowed and drawing-out of the belt 20 from the spool 24 is allowed, whereby extension of the buckle main body 18 (including the tongue 16) to the upper side is allowed. Therefore, the load acted from the webbing 14 to the occupant (particularly, the chest) is reduced (limited to the load for torsionally deforming the torsion shaft 32), and the kinetic energy of the occupant is absorbed by the torsional deformation of the torsion shaft 32.

Figure 6:
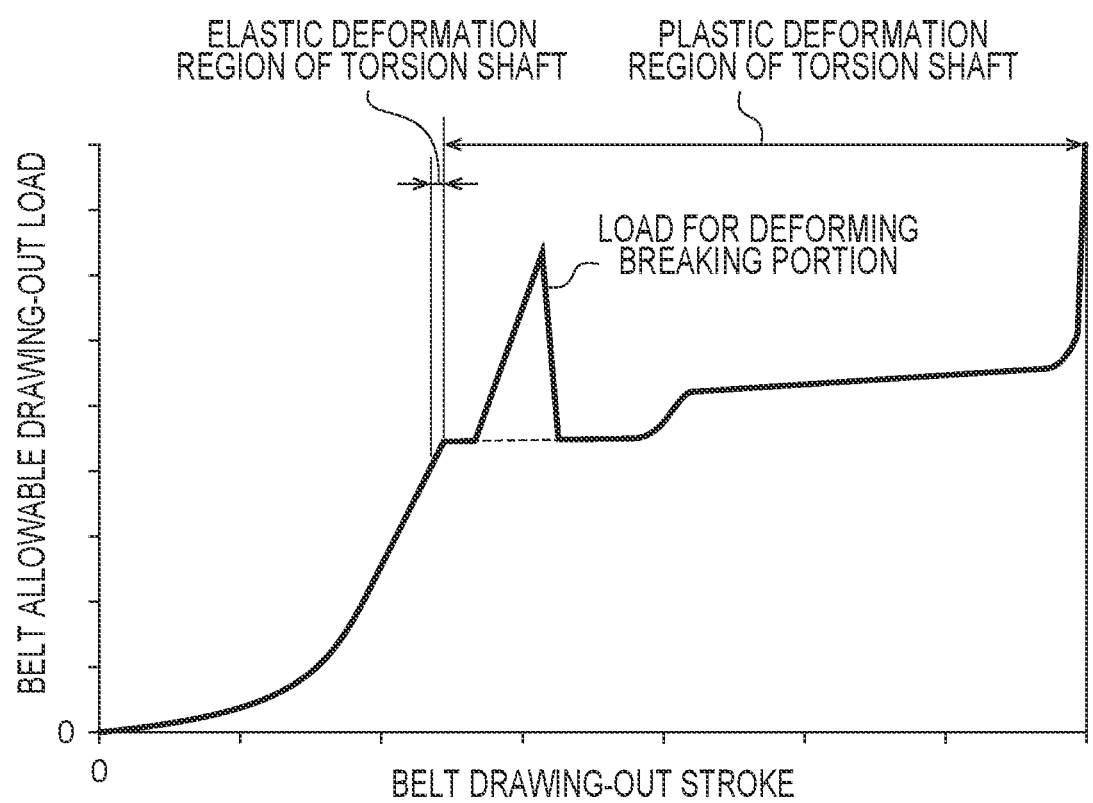
FIG. 6 is a graph showing a relationship between a belt drawing-out stroke (horizontal axis) and a belt allowable drawing-out load (vertical axis) in the buckle device according to the embodiment of the present invention.

An allowable drawing-out load of the belt 20 being a load for allowing the drawing-out of the belt 20 (an extension allowable load of the buckle main body 18 being a load for allowing extension of the buckle main body 18, a force limiter load) is a load for torsionally deforming the torsion shaft 32. As shown in FIG. 6, the torsional deformation of the torsion shaft 32 is started after the belt 20 (including the winding portion to the spool 24) has extended after the slack of the belt 20 has removed. Then, when the torsion shaft 32 is torsionally deformed, the torsion shaft 32 is temporarily elastically deformed, the load for torsionally deforming the torsion shaft 32 is gradually increased, and then the torsion shaft 32 is plastically deformed, and the load for torsionally deforming the torsion shaft 32 is maintained.

By the way, the side surface of the coupling hole 24B of the spool 24 abuts on the breaking portion 36 of the shear plate 34, whereby the breaking portion 36 can restrict the rotation of the spool 24 to restrict the drawing-out of the belt 20.

Here, when or after the torsional deformation of the torsion shaft 32 has started and the allowance of the drawing-out of the belt 20 has started, the breaking portion 36 is started to be deformed (including partial breaking) by the side surface of the coupling hole 24B (particularly, the portion at the outer circumferential position of the spool 24), whereby the breaking portion 36 allows the rotation of the spool 24 and allows the drawing-out of the belt 20 (see FIG. 6). Then, the tip portion 36A of the breaking portion 36 is broken off from the base end side portion of the breaking portion 36 by the side surface of the coupling hole 24B, whereby the breaking portion 36 permits the rotation of the spool 24 and permits the drawing-out of the belt 20.

Therefore, when the allowance of the drawing-out of the belt 20 is started, the allowable drawing-out load of the belt 20 can be made to be the sum of the load for torsionally deforming the torsion shaft 32 and the load for deforming each breaking portion 36, and can be increased. Accordingly, for example, in a light collision of the vehicle, the torsion shaft 32 can be prevented from being torsionally deformed when the rotational force acted from the occupant to the spool 24 via the webbing 14, the tongue 16, the buckle main body 18, and the belt 20 is small. Therefore, the torsion shaft 32 can be prevented from being unnecessarily torsionally deformed, and the buckle main body 18 can be prevented from being unnecessarily extended.

The allowable drawing-out load of the belt 20 when the allowance of the drawing-out of the belt 20 is started is not only the load for deforming each breaking portion 36, but is obtained by adding the load for torsionally deforming the torsion shaft 32 to the load for deforming each breaking portion 36. Therefore, it is possible to reduce the necessity of increasing the strength of the shear plate 34 (breaking portion 36) in order to increase the allowable drawing-out load of the belt 20 when the allowance of the drawing-out of the belt 20 is started, and it is possible to reduce the size and weight of the shear plate 34. Moreover, it is possible to prevent the allowable drawing-out load of the belt 20 when the allowance of the drawing-out of the belt 20 is started from being affected by the variations in the physical properties of the shear plate 34 (breaking portion 36), and it is possible to suppress the variations in the allowable drawing-out load of the belt 20 when the allowance of the drawing-out of the belt 20 is started.

When or after the plastic deformation of the torsion shaft 32 has started (in the present embodiment, after the plastic deformation of the torsion shaft 32 has started), the breaking portion 36 is started to be deformed by the side surface of the coupling hole 24B, whereby the breaking portion 36 allows the spool 24 to rotate and allows the belt 20 to be drawn out (see FIG. 6).

Therefore, since each of the breaking portions 36 is deformed when or after the load for torsionally deforming the torsion shaft 32 has increased, the allowable drawing-out load of the belt 20 when the allowance of the drawing-out of the belt 20 is started can be effectively increased.

The torsion shaft 32 and the shear plate 34 (breaking portion 36) are locked in rotation by the same case 30. Therefore, the accuracy of the relative circumferential position between the torsion shaft 32 and the breaking portion 36 can be increased, and the accuracy of the relative timing between the deformation start of the torsion shaft 32 and the deformation start of the breaking portion 36 can be increased.

The rear side of the regulation recessed portion 30E of the case 30 is closed by the leg plate 22B of the frame 22, whereby the broken tip 36A (broken piece 36A) of the breaking portion 36 is disabled from passing through the opening to the inner hole 30C of the regulation recessed portion 30E in the case 30, and the broken piece 36A is blocked from entering the inner hole 30C from the regulation recessed portion 30E (see FIG. 4C). Therefore, it is possible to prevent the broken piece 36A from inhibiting the rotation of the spool 24, the torsional deformation of the torsion shaft 32, and the rotation of a portion other than the broken piece 36A of the shear plate 34 in the inner hole 30C.

Moreover, the dimension in the width direction of the broken tip 36A (broken piece 36A) of the breaking portion 36 is increased toward the radial outside of the shear plate 34 (the radial outside of the inner hole 30C), and the dimension in the width direction of the regulation recessed portion 30E is decreased toward the radial inside of the inner hole 30C. Therefore, it is possible to effectively disable the broken piece 36A from passing through the opening to the inner hole 30C of the regulation recessed portion 30E, and it is possible to effectively block the broken piece 36A from entering the inner hole 30C from the regulation recessed portion 30E.

In the present embodiment, the breaking portion 36 is started to be deformed when or after the plastic deformation of the torsion shaft 32 has started. However, when or after the torsional deformation of the torsion shaft 32 has started, the breaking portion 36 may be started to be deformed before the plastic deformation of the torsion shaft 32 is started.

What is claimed is:

1. A buckle device, comprising:
   a buckle main body with which a tongue provided at a webbing to be applied to an occupant is engaged;
   a coupling member whose tip side is coupled to the buckle main body;
   a winding shaft around which the coupling member is wound from a base end side;
   a restricting member configured to restrict drawing-out of the coupling member from the winding shaft, the restricting member being deformed and allowing drawing-out of the coupling member from the winding shaft to allow extension of the buckle main body;
   a breaking member configured to restrict drawing-out of the coupling member from the winding shaft, deformation of the breaking member being started to allow drawing-out of the coupling member from the winding shaft when or after the restricting member has started to be deformed, and the breaking member being broken to permit drawing-out of the coupling member from the winding shaft, and
   a locking body to which the restricting member and the breaking member are locked.

2. The buckle device according to claim 1, wherein deformation of the breaking member is started when or after plastic deformation of the restricting member has started.

3. The buckle device according to claim 1, further comprising a blocking portion configured to block entry of a broken piece that has broken off of the breaking member to at least one of a winding shaft side or a restricting member side.

4. The buckle device according to claim 1, wherein the winding shaft deforms the breaking member.

5. The buckle device according to claim 1, wherein the winding shaft deforms a plurality of portions, in a circumferential direction of the winding shaft, of the breaking member.

6. The buckle device according to claim 1, wherein the winding shaft is brought into contact with or separated from the breaking member, and the restricting member is deformed such that the winding shaft deforms the breaking member.

7. The buckle device according to claim 1, wherein the restricting member is disposed outside the winding shaft.

8. The buckle device according to claim 1, wherein the breaking member is disposed between the winding shaft and the restricting member.

9. The buckle device according to claim 1, further comprising a support body configured to support the winding shaft and to have the restricting member and the breaking member disposed outside.

10. A buckle device, comprising:
    a buckle main body with which a tongue provided at a webbing to be applied to an occupant is engaged;
    a coupling member whose tip side is coupled to the buckle main body;

a winding shaft around which the coupling member is wound from a base end side;

a restricting member configured to restrict drawing-out of the coupling member from the winding shaft, the restricting member being deformed and allowing drawing-out of the coupling member from the winding shaft to allow extension of the buckle main body;

a breaking member configured to restrict drawing-out of the coupling member from the winding shaft, deformation of the breaking member being started to allow drawing-out of the coupling member from the winding shaft when or after the restricting member has started to be deformed, and the breaking member being broken to permit drawing-out of the coupling member from the winding shaft, and wherein the breaking member is disposed between the winding shaft and the restricting member.

* * * * *